E. BASEMAN.
ADJUSTING LEVER MECHANISM.
APPLICATION FILED AUG. 1, 1910.
1,004,728.
Patented Oct. 3, 1911.
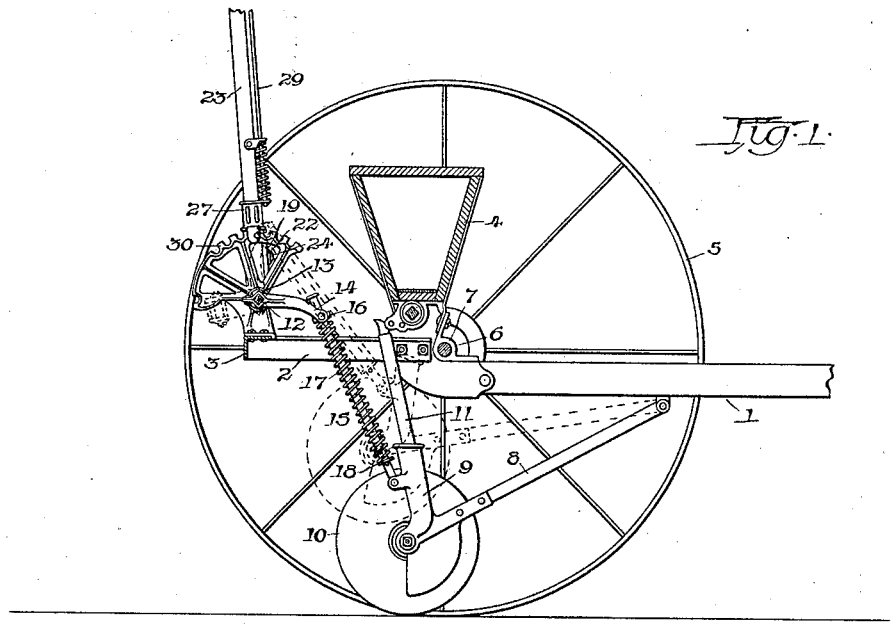
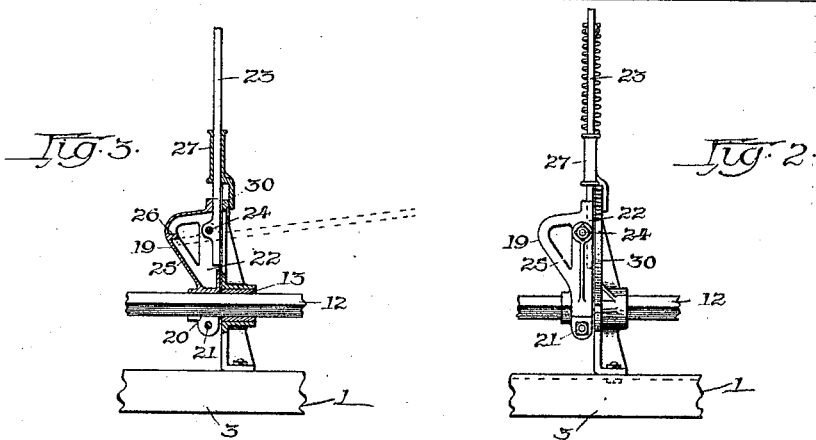
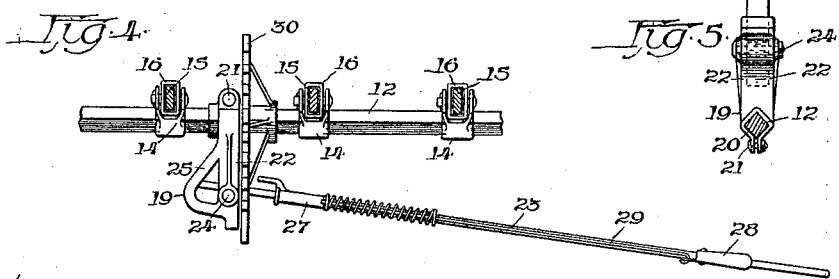
Witnesses:
F.W. Hoffmeister.
H. J. Jasmer
Inventor:
Ernest Baseman.
By E.W. Burgess
Attorney

UNITED STATES PATENT OFFICE.

ERNEST BASEMAN, OF HAMILTON, ONTARIO, CANADA, ASSIGNOR TO INTERNATIONAL HARVESTER COMPANY, A CORPORATION OF NEW JERSEY.

ADJUSTING-LEVER MECHANISM.

1,004,728. Specification of Letters Patent. Patented Oct. 3, 1911.

Application filed August 1, 1910. Serial No. 575,037.

*To all whom it may concern:*

Be it known that I, ERNEST BASEMAN, a citizen of the United States, residing at Hamilton, in the county of Wentworth and Province of Ontario, Canada, have invented certain new and useful Improvements in Adjusting-Lever Mechanism, of which the following is a specification.

My invention relates to means for adjusting the furrow openers of grain drills in a manner whereby the depth of the furrow formed thereby may be regulated, and consists in an improved form of lever mechanism permitting the lever to be folded about a pivotal bearing in a manner to occupy a position parallel with the grain hopper, the object being to provide a lever mechanism that is operative in a common way to adjust the position of the furrow openers during the operation of the machine, and to be folded out of the way for transporting or storage purposes.

I attain these objects by means of the mechanism illustrated by the accompanying drawing, in which—

Figure 1 represents an end elevation, partly in section, of a grain drill having my invention forming a part thereof; Fig. 2 is a detached detail of the lever mechanism; Fig. 3 is a sectional elevation of Fig. 2; Fig. 4 is a detached detail showing the adjusting lever in its folded position; and Fig. 5 is a detail designed to show the manner of connecting the parts of the jointed lever.

The same reference characters designate like parts throughout the several views.

1 represents the draft frame of a grain drill, including rearwardly extending bars 2 and a rear transverse bar 3.

4 represents a grain hopper mounted upon the frame, 5 one of the carrying wheels mounted upon an axle 6 journaled in bearings 7 secured to the frame.

8 represents one of a series of drag bars, having its forward end pivotally connected with the draft frame in a manner permitting its rear end to rise and fall in a common way.

9 represents a grain tube secured to the rear end of the drag bar and having a rotatable disk furrow opener 10 journaled thereon.

11 represents a flexible grain tube connected at its upper end with the grain distributing devices forming part of the hopper mechanism and having its lower end slidably received by the fixed grain tube in a manner to conduct the grain to the latter and thence to the furrow, and also permitting a rising and falling movement of the furrow openers.

12 represents a rock shaft preferably angular in cross section, journaled in bearings 13 secured to the rear of the machine frame and having a series of arms 14 corresponding in number to the furrow openers secured thereto, the arms being connected with the grain tube 9 by means of links 15 that have their lower ends pivotally connected to said tubes and their upper ends received by blocks 16 that are pivotally connected with the forward ends of the arms 14, and 17 represent compression springs surrounding the links and operative between the blocks and adjustable washers 18 to yieldingly press the furrow openers in contact with the soil in a common way.

19 represents an arm having an angular opening 20 at one end thereof adapted to receive the rock shaft 12, and 21 represents a clamping bolt for securing the arm to the shaft. The arm includes outwardly extending side members 22 spaced apart in a manner to receive between them the inner end of a hand lever 23 that is pivotally connected with the side members by means of a cross pin 24. The side members are provided with laterally extending web portions 25 that are connected by means of a bridge member 26 operative as a stop to limit a swinging movement of the hand lever in one direction, as shown by dotted lines in Fig. 3. The hand lever is provided with a sliding spring pressed detent 27 that is controlled by means of a thumb lever 28 and connecting link 29 in a manner to engage with a notched sector 30 that forms part of one of the supports of the rock shaft. The face of the sector adjacent the lever is in close contact therewith and also with the inner edges of the side members of arm 19 in a manner to retain the lever in operative position when it is manipulated to adjust the working depth of the furrow openers.

When it is desired to raise the furrow openers to an inoperative position for transporting or storage purposes, the hand lever is moved rearward and downward until the detent has passed the rear end of the sector, when the lever may be swung laterally about its pivotal connection with the arm substantially parallel with the rock shaft, as shown in Fig. 4, in which position it engages with the lower side of the sector in a manner to retain the furrow openers in a raised and inoperative position.

What I claim as my invention, and desire to secure by Letters Patent, is:

1. An adjusting lever mechanism including, in combination, a rock shaft, a relatively fixed toothed sector concentric with the axis of said shaft, an arm secured to said shaft adjacent said sector, a hand lever pivotally connected with said arm, the axis thereof being at right angles with said shaft, and means for locking said hand lever in engagement with said sector, said lever being adapted to swing laterally relative to said sector to a position substantially parallel with said shaft when said lever has reached a predetermined limit of movement in one direction.

2. An adjusting lever mechanism including, in combination, a rock shaft, a relatively fixed toothed sector concentric with the axis of said shaft, an arm secured to said shaft adjacent said sector, said arm including side members spaced apart, a hand lever having its inner end received between said side members and pivotally connected therewith, the axis of its pivotal connection being at right angles with the axis of said rock shaft, and means for locking said hand lever in engagement with said sector, said hand lever being permitted to move beyond one edge of said sector and to swing laterally relative thereto in the direction of the axis of said shaft and to engage with the edge of said sector in a manner to lock said lever in its adjusted position.

3. An adjusting lever mechanism including, in combination, a rock shaft, a relatively fixed toothed sector concentric with the axis of said shaft, an arm secured to said shaft adjacent said sector, said arm including side members spaced apart and having laterally extending web portions, a hand lever having its inner end received between said side members and pivotally connected therewith, the axis of its pivotal connection being at right angles with the axis of said rock shaft, means for locking said hand lever in engagement with said sector, said lever being permitted to swing laterally relative to said sector when it has moved to a predetermined limit in one direction, and a bridge member connecting said web portions and adapted to contact with the inner end of said lever in a manner to limit a lateral swinging movement thereof.

ERNEST BASEMAN. [L. S.]

Witnesses:
JOHN N. C. THOMPSON,
A. W. TORY.

---

Copies of this patent may be obtained for five cents each, by addressing the "Commissioner of Patents, Washington, D. C."